(12) United States Patent
Kunze et al.

(10) Patent No.: US 10,477,080 B2
(45) Date of Patent: Nov. 12, 2019

(54) CAMERA WITH CURLED LID AND SPRING ELEMENT FOR PCB POSITIONING

(71) Applicant: MAGNA ELECTRONICS INC., Auburn Hills, MA (US)

(72) Inventors: Norbert Kunze, Diez (DE); Oswin Vogl, Kehl (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 34 days.

(21) Appl. No.: 15/642,749

(22) Filed: Jul. 6, 2017

(65) Prior Publication Data

US 2018/0013935 A1    Jan. 11, 2018

Related U.S. Application Data

(60) Provisional application No. 62/408,953, filed on Oct. 17, 2016, provisional application No. 62/359,238, filed on Jul. 7, 2016.

(51) Int. Cl.
  *H04N 5/225*  (2006.01)
  *H04N 7/18*   (2006.01)
  *B60R 1/00*   (2006.01)

(52) U.S. Cl.
  CPC ............ *H04N 5/2252* (2013.01); *B60R 1/00* (2013.01); *H04N 5/2253* (2013.01); *H04N 5/2254* (2013.01); *H04N 7/183* (2013.01); *B60R 2300/80* (2013.01)

(58) Field of Classification Search
  CPC .................................................. H04N 5/2252
  USPC ...................................................... 348/373
  See application file for complete search history.

(56) References Cited

U.S. PATENT DOCUMENTS

| | | |
|---|---|---|
| 4,994,829 A | 2/1991 | Tsukamoto |
| 5,550,677 A | 8/1996 | Schofield et al. |
| 5,670,935 A | 9/1997 | Schofield et al. |
| 5,949,331 A | 9/1999 | Schofield et al. |
| 7,835,634 B2 | 11/2010 | Berend et al. |
| 7,965,336 B2 | 6/2011 | Bingle et al. |
| 8,044,776 B2 | 10/2011 | Schofield et al. |
| 8,542,451 B2 | 9/2013 | Lu et al. |
| 8,861,951 B2 | 10/2014 | Warren et al. |
| 8,866,907 B2 | 10/2014 | McElroy et al. |
| 9,233,641 B2 | 1/2016 | Sesti et al. |
| 9,277,104 B2 | 3/2016 | Sesti et al. |

(Continued)

FOREIGN PATENT DOCUMENTS

WO    2013103548 A1    7/2013

*Primary Examiner* — Joel W Fosselman

(74) *Attorney, Agent, or Firm* — Honigman LLP

(57) ABSTRACT

A camera for a vehicle vision system includes a housing having a front housing portion with a lens barrel and lens assembly, and a rear housing portion with a connector. The front and rear housing portions are mated together to establish an inner cavity in the housing. An imager circuit board is disposed in the inner cavity of the housing, with an imager disposed at the imager circuit board and optically aligned with the lens assembly. When the front and rear housing portions are mated together, perimeter flanges of the front and rear housing portions may be curled to have multiple folds to seal the front housing portion relative to the rear housing portion. The imager circuit board may be held in the inner cavity by a spring element that urges the imager circuit board in a direction toward the lens assembly.

15 Claims, 13 Drawing Sheets

(56) References Cited

U.S. PATENT DOCUMENTS

| | | |
|---|---|---|
| 9,304,386 B1 | 4/2016 | Clement et al. |
| 9,491,342 B2 | 11/2016 | Winter et al. |
| 9,819,845 B2 | 11/2017 | Winter et al. |
| 2006/0186127 A1* | 8/2006 | Rajesh .................. B21D 51/30 |
| | | 220/619 |
| 2009/0069791 A1 | 3/2009 | Connolly et al. |
| 2009/0142660 A1* | 6/2009 | Hori .................... H01M 2/0421 |
| | | 429/174 |
| 2009/0244361 A1 | 10/2009 | Gebauer et al. |
| 2010/0097519 A1* | 4/2010 | Byrne ...................... B60R 1/00 |
| | | 348/373 |
| 2011/0310248 A1 | 12/2011 | McElroy et al. |
| 2013/0242099 A1 | 9/2013 | Sauer et al. |
| 2014/0373345 A1 | 12/2014 | Steigerwald |
| 2015/0222795 A1 | 8/2015 | Sauer et al. |
| 2015/0266430 A1 | 9/2015 | Mleczko et al. |
| 2015/0321621 A1 | 11/2015 | Van Dan Elzen et al. |
| 2015/0365569 A1 | 12/2015 | Mai et al. |
| 2016/0037028 A1 | 2/2016 | Biemer |
| 2016/0268716 A1 | 9/2016 | Conger et al. |
| 2017/0133811 A1 | 5/2017 | Conger et al. |
| 2017/0295306 A1 | 10/2017 | Mleczko |
| 2017/0302829 A1 | 10/2017 | Mleczko et al. |

\* cited by examiner

US 10,477,080 B2

CAMERA WITH CURLED LID AND SPRING ELEMENT FOR PCB POSITIONING

CROSS REFERENCE TO RELATED APPLICATIONS

The present application claims the filing benefits of U.S. provisional applications, Ser. No. 62/408,953, filed Oct. 17, 2016, and Ser. No. 62/359,238, filed Jul. 7, 2016, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vehicle camera, such as a camera for a driver assistance system or vision system or imaging system of a vehicle, which captures image data representative of images exterior of the vehicle. The housing or body portions of the camera have perimeter flanges that, when the housing portions are mated together, are curled to have multiple folds to seal the housing portions. The curled flanges provide a labyrinth seal about the periphery of the interface of the mated housing portions to seal the circuit board and circuitry within an inner cavity of the camera. The camera also includes a spring element that positions and holds the circuit board in the inner cavity of the camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
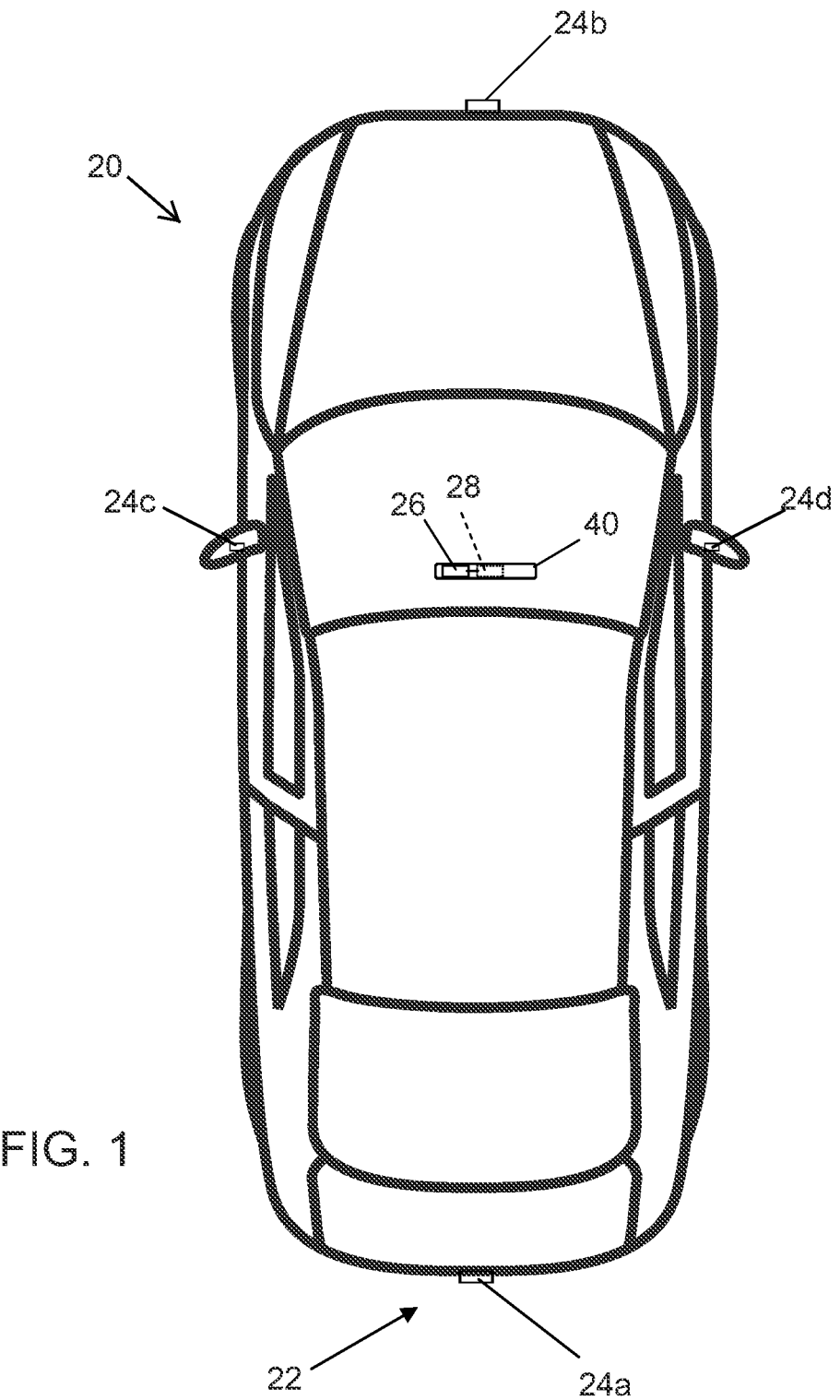
FIG. 1 is a plan view of a vehicle with a vision system that incorporates cameras in accordance with the present invention.

Referring now to the drawings and the illustrative embodiments depicted therein, a vehicle 20 includes an imaging system or vision system 22 that includes at least one exterior facing or viewing imaging sensor or camera, such as a rearward viewing imaging sensor or camera 24a (and the system may optionally include multiple exterior facing or viewing imaging sensors or cameras, such as a forward viewing camera 24b at the front (or at the windshield) of the vehicle, and a sideward/rearward viewing camera 24c, 24d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 22 includes a control or electronic control unit (ECU) or processor 28 that is operable to process image data captured by the camera or cameras and may detect objects or the like and/or provide displayed images at a display device 26 for viewing by the driver of the vehicle (although shown in FIG. 1 as being part of or incorporated in or at an interior rearview mirror assembly 40 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
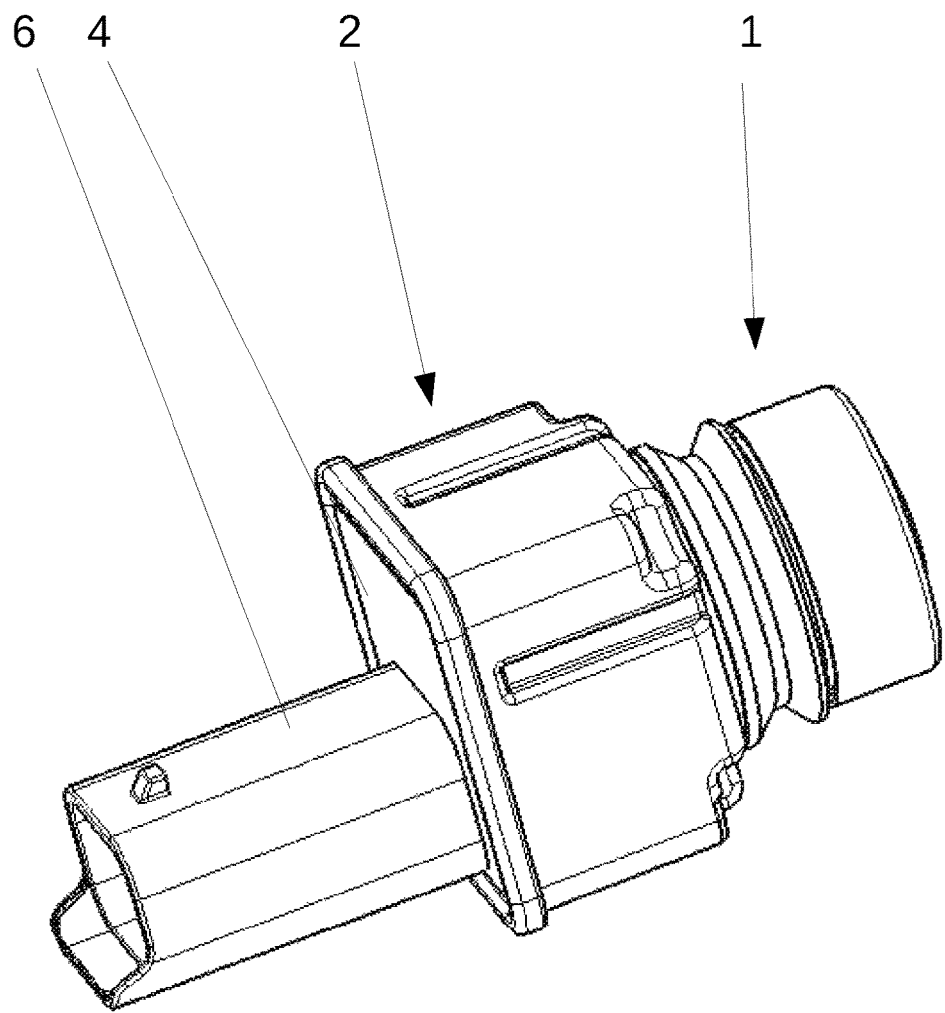
FIG. 2 is a perspective view of a camera of the present invention.
Figure 11:
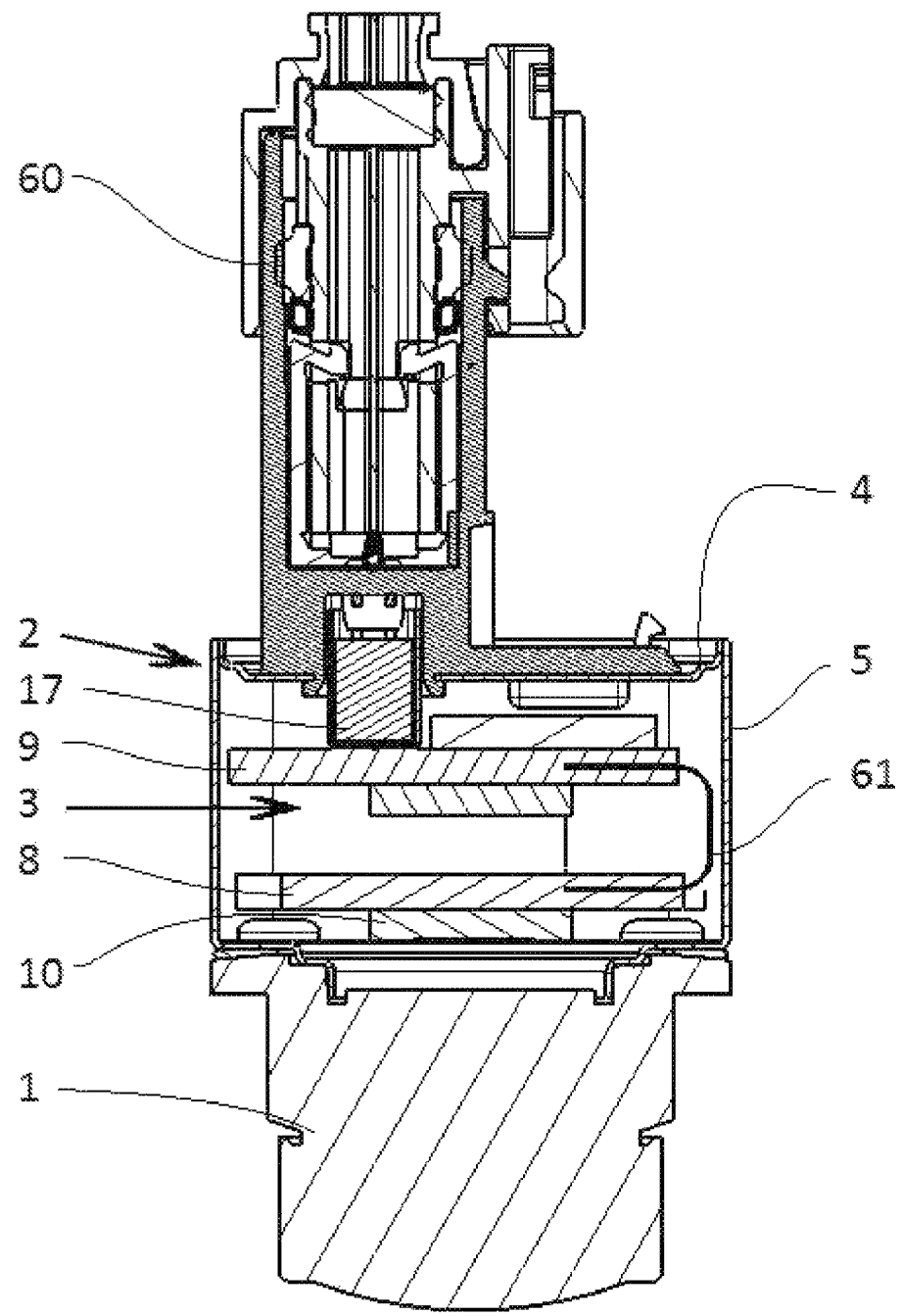
FIG. 11 is a sectional view of another example of a camera with a deep drawn camera body having an outbounding connector portion applied by outsert molding.
Figure 12:
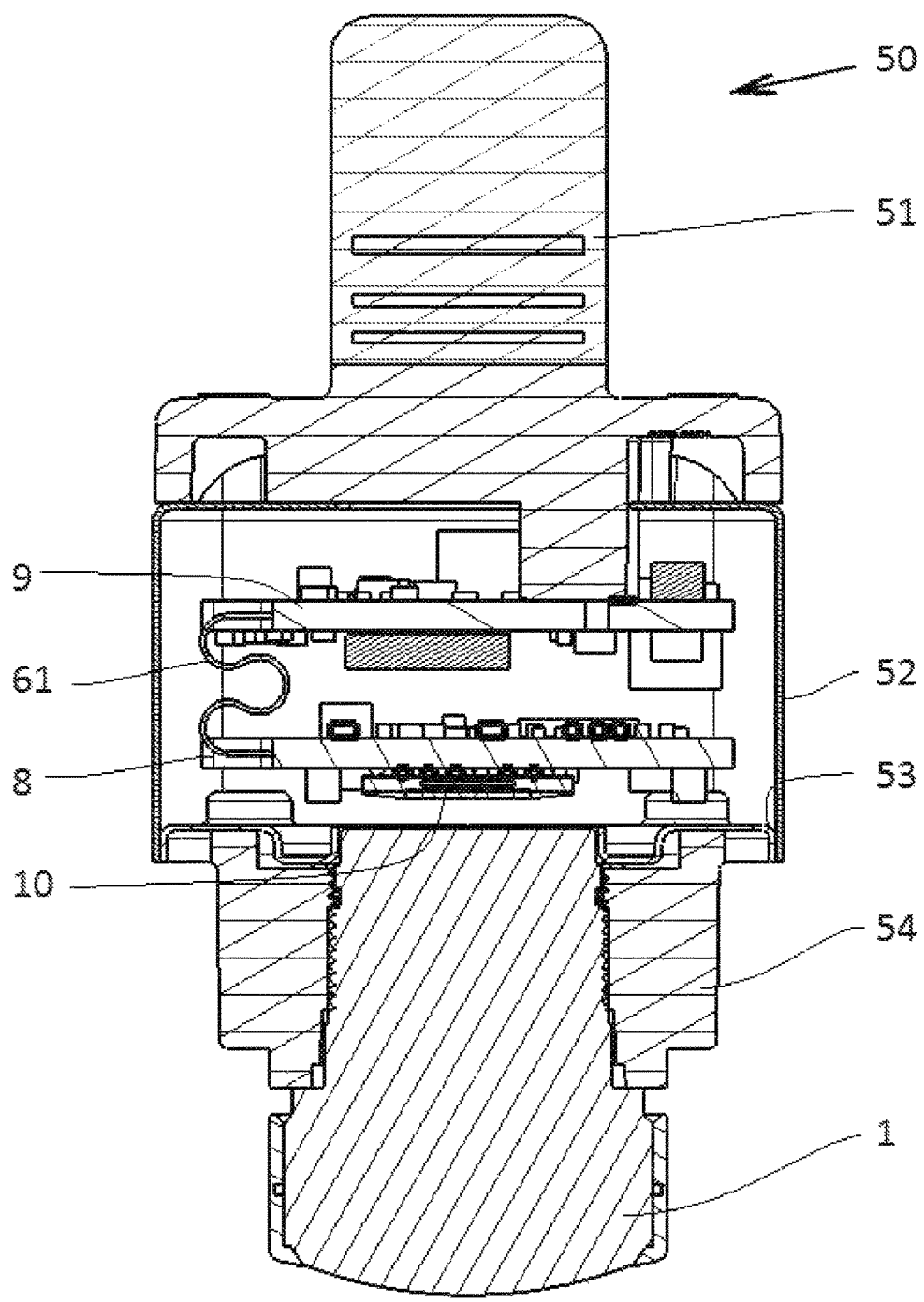
FIG. 12 is a sectional view of a camera for a "pig tail" application, shown with a deep drawn camera body and a lid at the lens barrel side and with the lens barrel holder applied by outsert molding.

The vehicle camera shown in FIG. 2 comprises a lens stack or barrel portion 1, a body portion 2 with electronics 3 in it, a lid 4 which seals the body portions housing 5, and a connector portion 6. The electronics may comprise one, two or more PCBs such as shown in example of FIG. 3. Both or all of the PCBs may have a conventional board to board connector 14 and 15 or other suitable connector, such as a flex-foil connector 62 (FIGS. 11 and 12).

Figure 4:
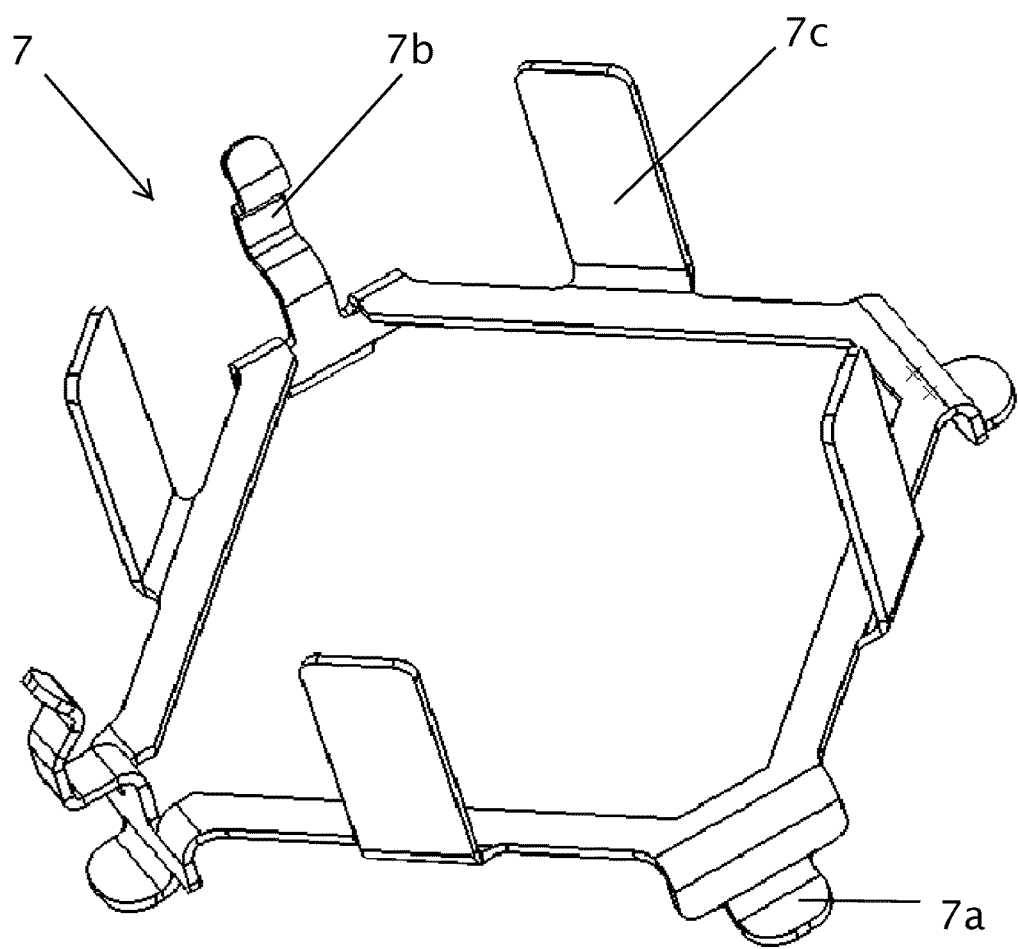
FIG. 4 is a perspective view of a spring element for holding a printed circuit board in the camera.

In accordance with the present invention, the PCBs may be held in thermal stable place and be fixated by a spring element 7 or spring elements. The spring elements may optionally be part of the camera's body housing 5. Optionally, the spring element 7 or elements may be a separate part such as shown in example of FIG. 4. The spring element may be formed out of sheet metal, spring steel, and may be formed or produced by stamping or forging or the like, or the spring element may be formed out of plastic and produced by molding or printing or the like. The spring element 7 includes PCB contacting elements 7a that engage PCB 8 and PCB retaining elements 7b that receive and retain PCB 9 (such as at two or more corner regions of the PCB) so as to space the PCBs 8 and 9 apart at a desired or selected distance and to retain the PCBs relative to one another and relative to the camera housing.

Figure 5A:
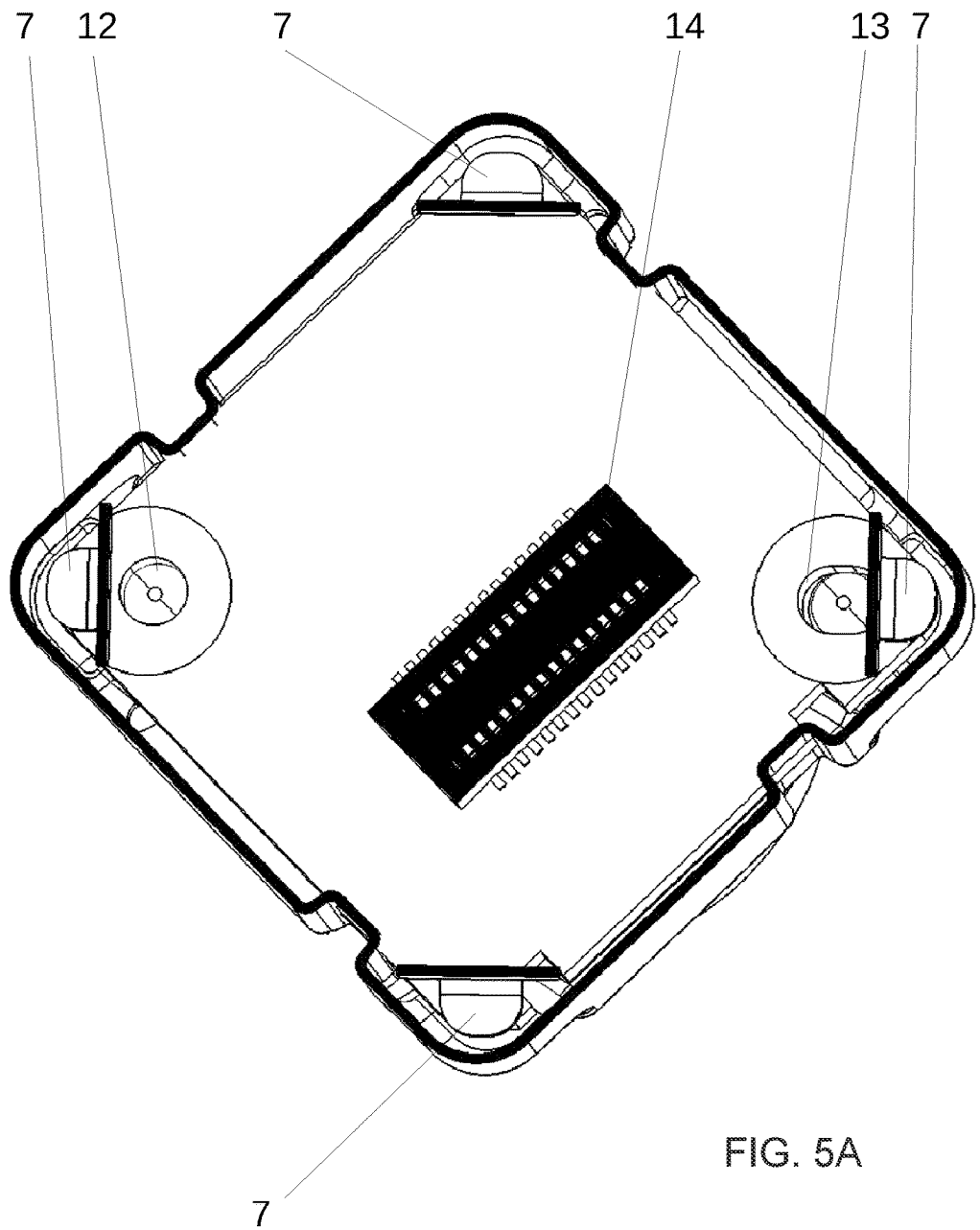
FIG. 5A is a plan view showing the printed circuit board held at the spring element in the camera.
Figure 5B:
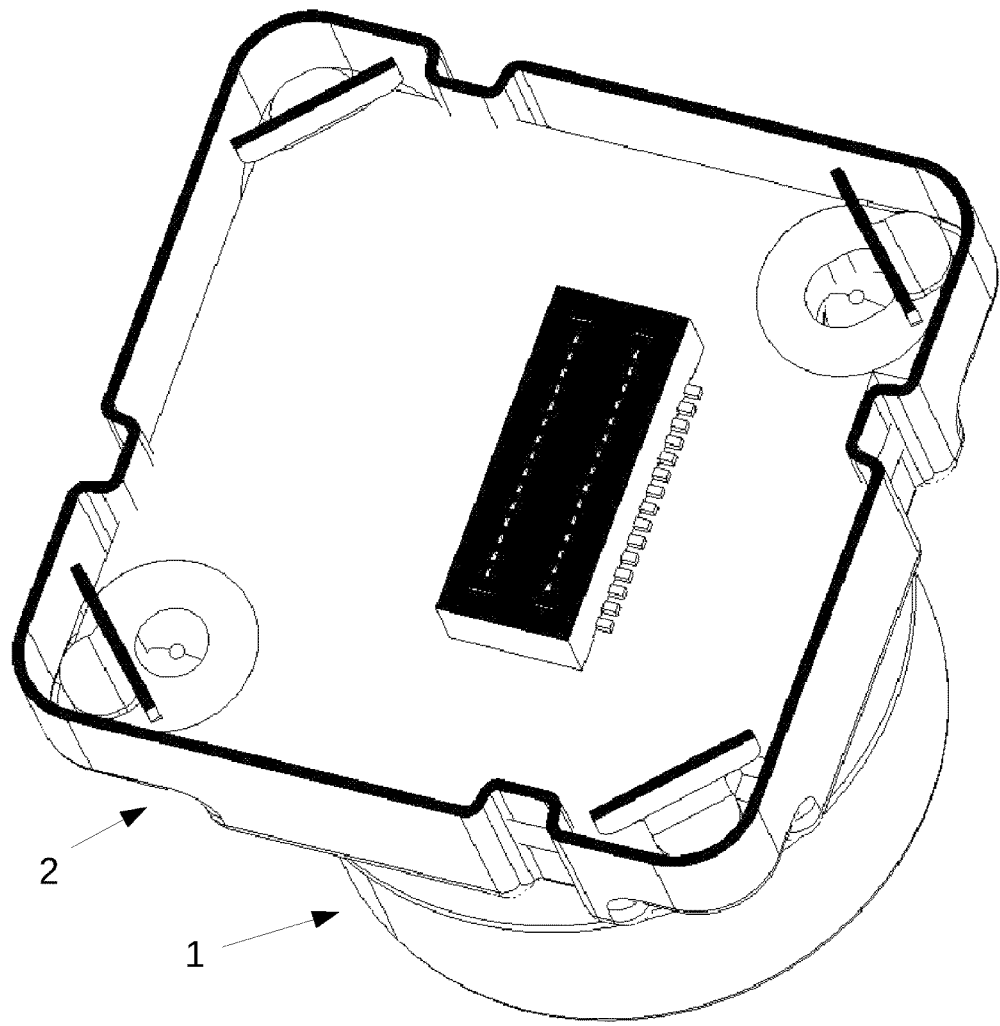
FIG. 5B is a perspective view of the printed circuit board and spring element and front housing portion of the camera.

The spring element achieves multiple advantageous purposes. For example, no screw is needed for fixating both or all of the PCBs (such as both PCBs 8 and 9). In the illustrated example of the FIG. 3, the spring 7 applies a force into the optical (longitudinal) direction to the PCBs. The PCB 8 with the camera's imager 10, near to the lens stack portion, rests on two lobes or domes 11 of the body portion housing 5. The PCB 8 has a round hole 12 and an oblong hole 13 for allowing the PCB to come to a fixed rest on the domes 8, such as shown in FIGS. 5A and 5B. The dome contours are well visible in FIG. 7. The PCBs may be interconnected by any kind of connection or connector. FIGS. 5A, 5B show one inter connector SMD part 14 which mates to a counter piece 15 on the opposing PCB. The closed connection is shown as cross section in FIG. 3. When the second PCB 9 (connector PCB) is stacked to the first PCB 8 (imager PCB), it may also get held in place by the spring element 7, such as can be seen with reference to FIGS. 3 and 6. The spring element 7 holds itself in place by flanges and foot structures resting in contours of the camera's body housing 5, optionally with contours to snap into. Optionally, the spring may be held in place and optionally may be compressed or activated when applying the lid onto the body housing (such as by the lid engaging the upper or outer ends of the flanges 7c.

Thus, the spring element 7 may be disposed in the front housing portion after the imager circuit board is disposed therein (and with the imager optically aligned with the lens), whereby the feet or contacting elements 7a of the spring element contact the corner regions of the imager PCB 8. The connector PCB 9 may be snapped into or received into the recesses of the flexible tabs 7b of the spring element, such that the connector PCB 9 is retained at a predetermined distance from the imager PCB 8. When the lid or rear housing portion is attached at the rear of the front housing portion, the spring element may be engaged and slightly compressed to urge or bias the imager PCB toward the front end of the front housing portion, while retaining the connector PCB in place within the camera housing.

The spring element 7 may additionally increase the heat dissipation from the electronics 3 towards the outer camera's body housing 5. Optionally, the spring element may also serve as an electrical conductor, such as, for example, for the ground potential or increase the shielding.

Vehicle camera housings may include multiple housing portions which may be fixated to another by crimping a crimping part over a section of the housing portions. Examples of such housings are described in International Publication No. WO 2013/103548, which is hereby incorporated herein by reference in its entirety.

Figure 3:
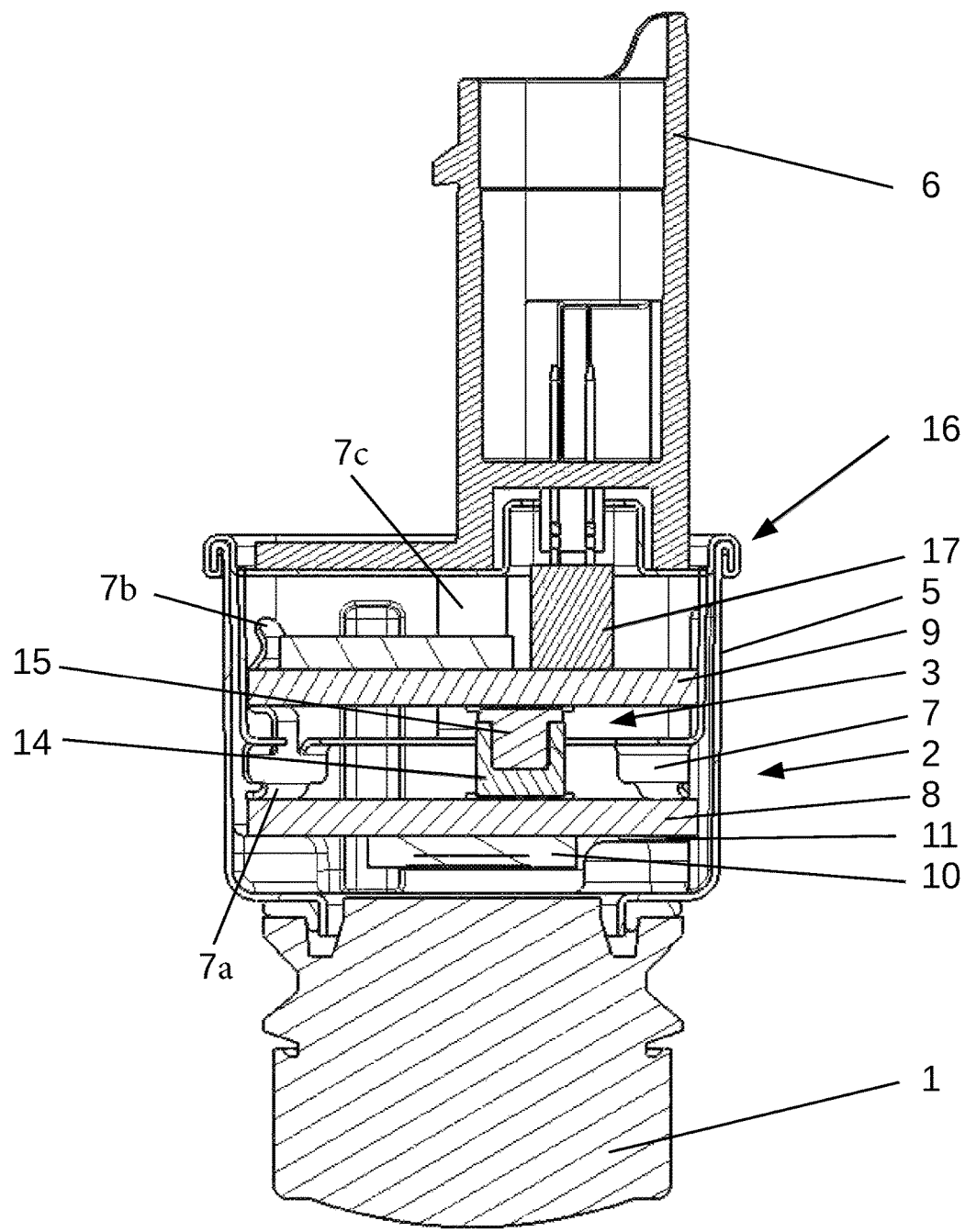
FIG. 3 is a sectional view of the camera of FIG. 2.
Figure 8:
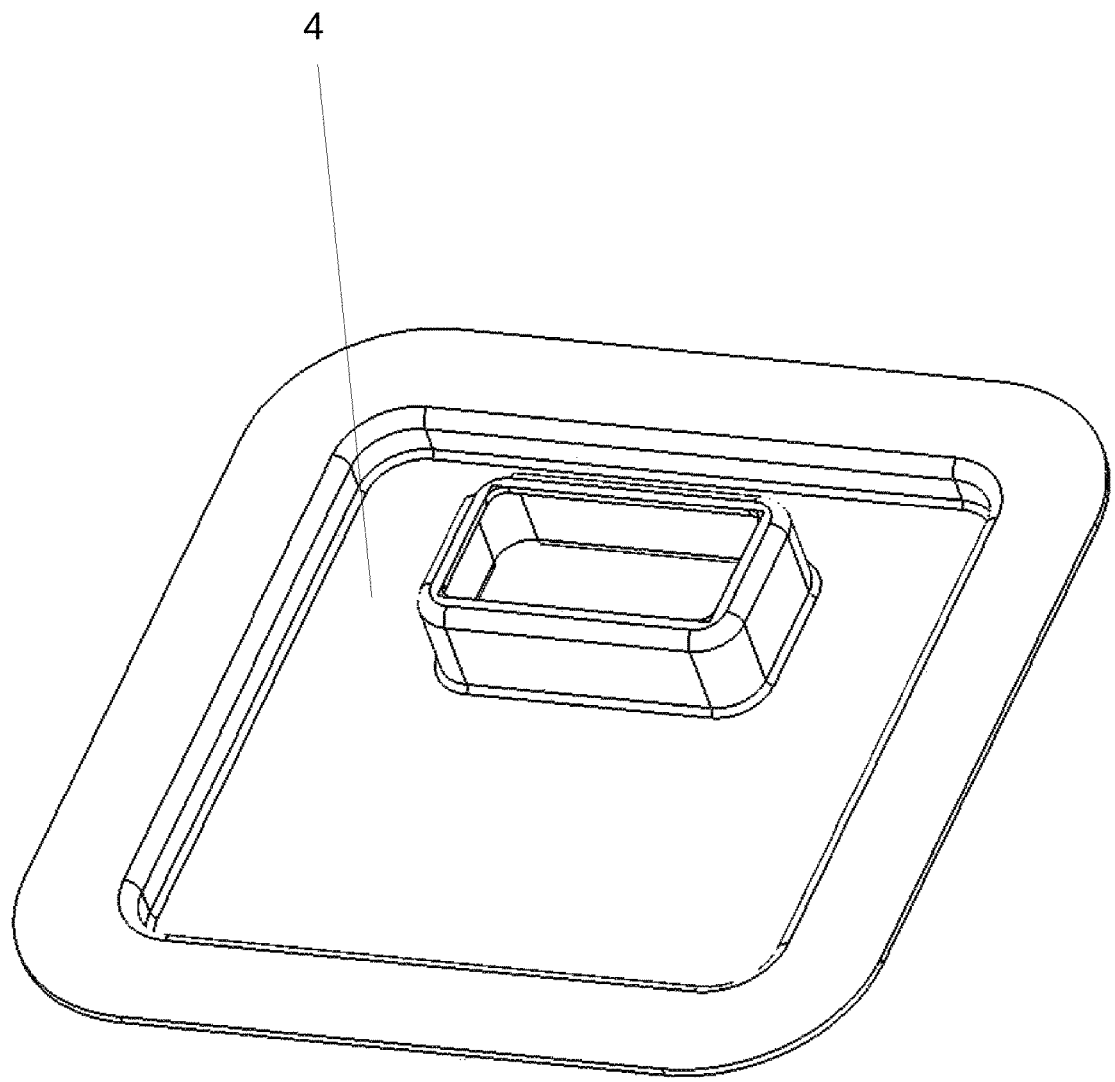
FIG. 8 is a perspective view of a lid which seals the housing portion of the camera.

In accordance with another aspect of the present invention, the camera's body housing or front housing portion 5 may be closed and sealed by a lid element or rear housing portion 4 (see FIG. 8), which gets water tightly fixated by curling. In contrast to the fixation and sealing method proposed in International Publication No. WO 2013/103548, no additional (crimping) part or material is necessary and no additional paste or O-ring inlay piece is necessary to seal the camera's housing parts water and air tight. By curling the material of the body housing and lid element, the opposing metal pieces get folded by multiple folds and by that a labyrinth seal is established (such as can be seen at 16 with reference to FIG. 3). By crimping, on the other hand, just one fold is done. In FIG. 3, the lid element 4 as readily attached to the camera's body housing 5 by curling is shown. The curling connection 16 of the lid in the example of FIG. 3 has two folds. As can be seen in FIG. 3, the perimeter flange or periphery of the body housing 5 has a generally J-shaped cross section, with the perimeter flange or periphery of the lid element 4 curled over and around the J-shaped flange of the body housing or front housing portion.

Thus, during assembly of the camera, the front and rear housing portions may initially have flat or planar flanges or structures, and the front housing portion may partially receive the rear housing portion within its planar flanges, such that the flanges of the rear housing portion extend beyond the flanges of the front housing portion (in the vertically upward direction in FIG. 3). The flange of the rear housing portion is folded over the edge and end portion of the flange of the front housing portion, such that there are three layers of flanges crimped together. The flanges are then both folded so that the flange of the front housing portion is generally J-shaped or U-shaped, and the flange of the rear housing portion has a spiral cross section, with the flanges forming five layers of flanges crimped together and thus forming a labyrinth that is substantially impervious to water entry between the flanges. Optionally, an adhesive/sealing layer or material or potting material may be disposed between the flanges before the curling/folding the flanges.

Figure 6:
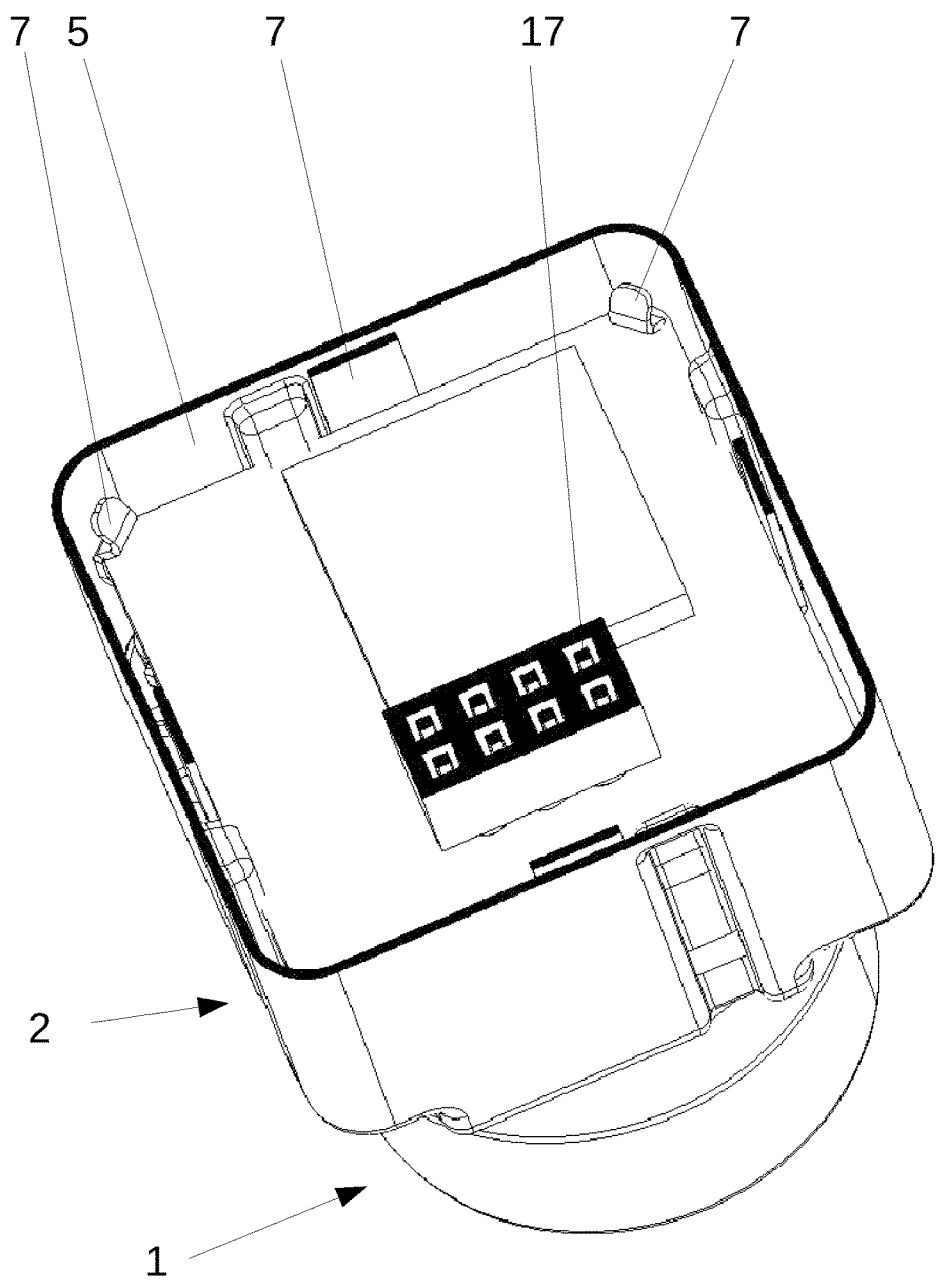
FIG. 6 is a perspective view of another printed circuit board held by the spring element of the camera.
Figure 7:
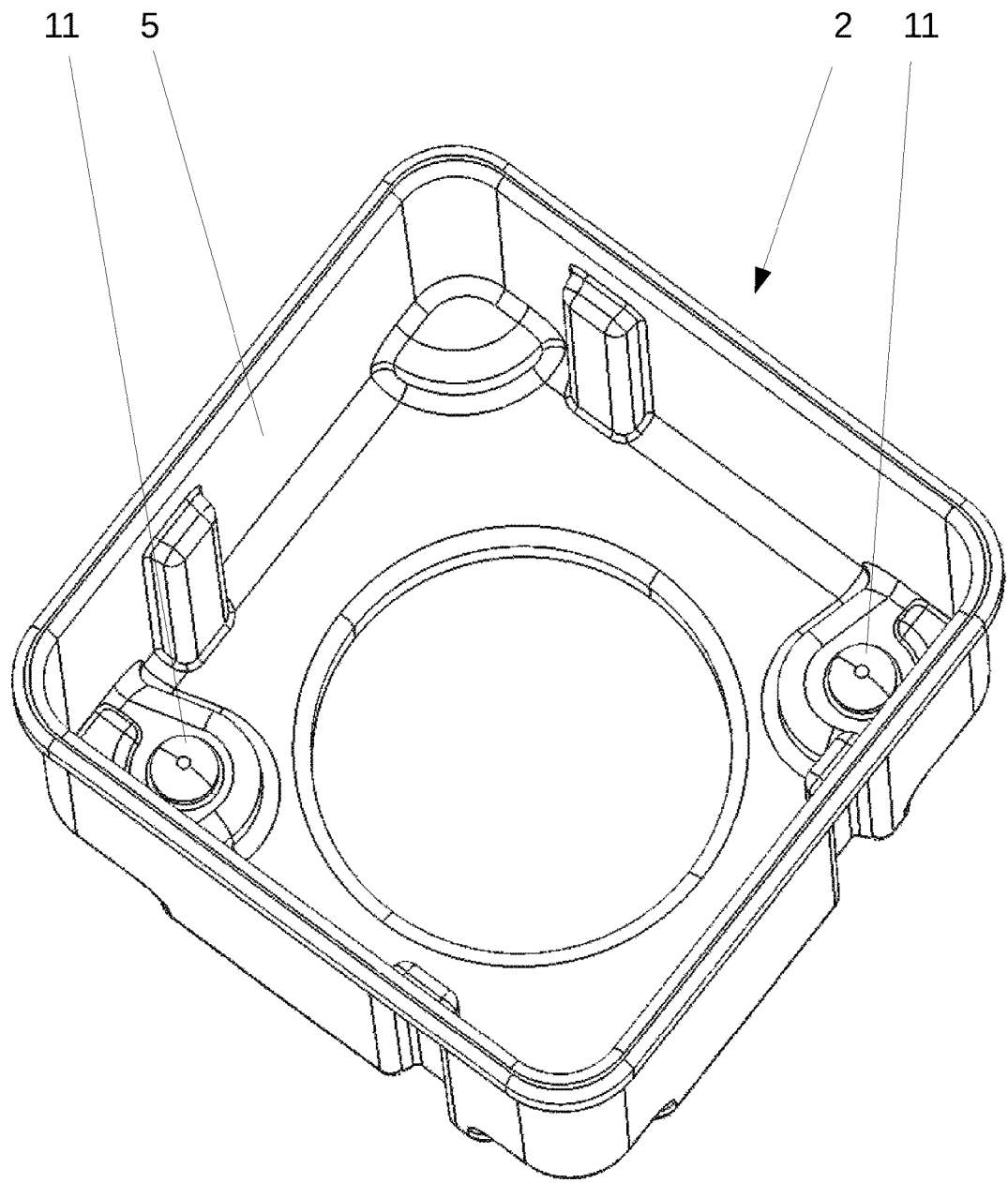
FIG. 7 is a perspective view of the front housing portion of the camera, showing domes of the front housing portion for supporting the imager printed circuit board.
Figure 9:
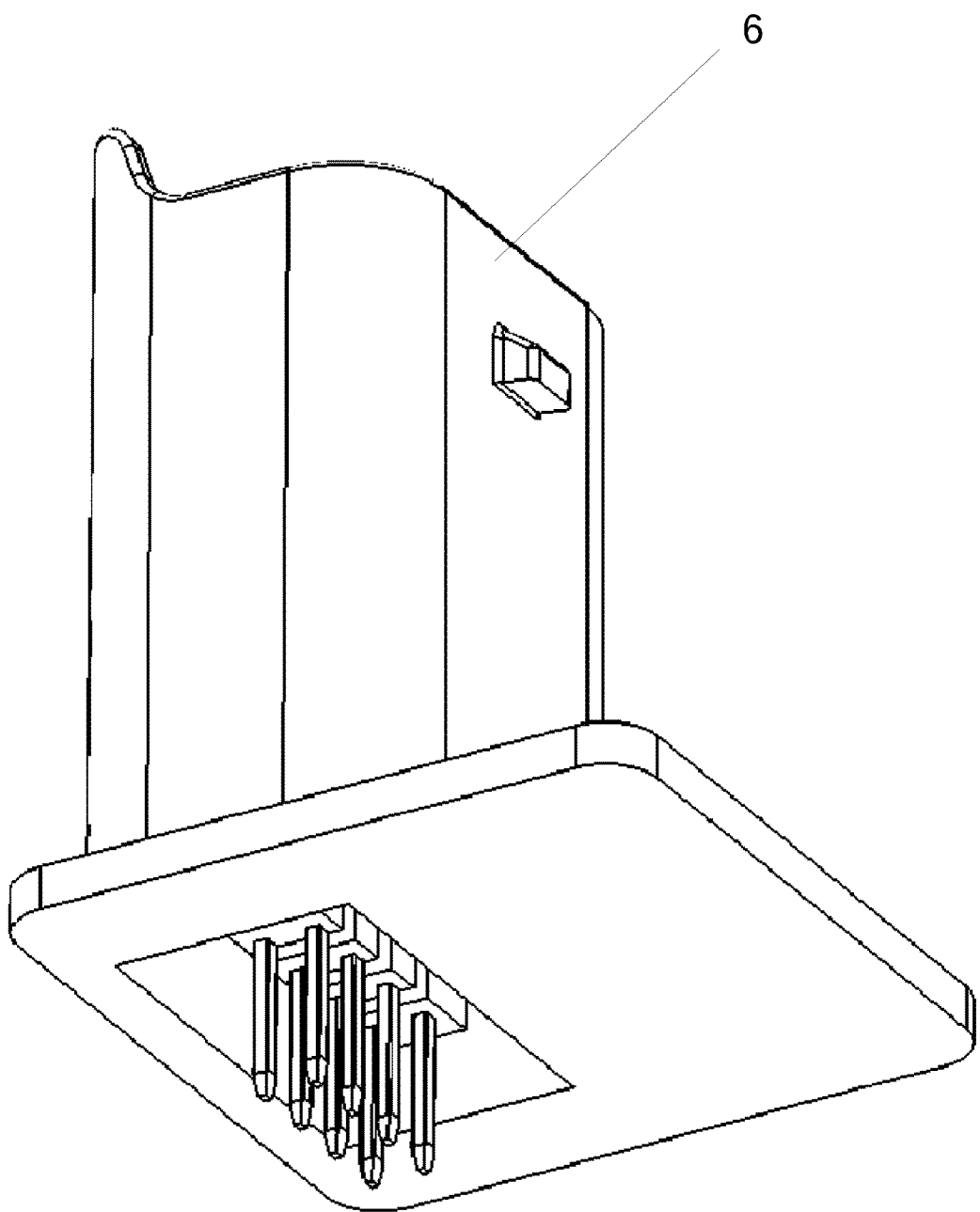
FIG. 9 is a perspective view of a connector portion of the camera.
Figure 10:
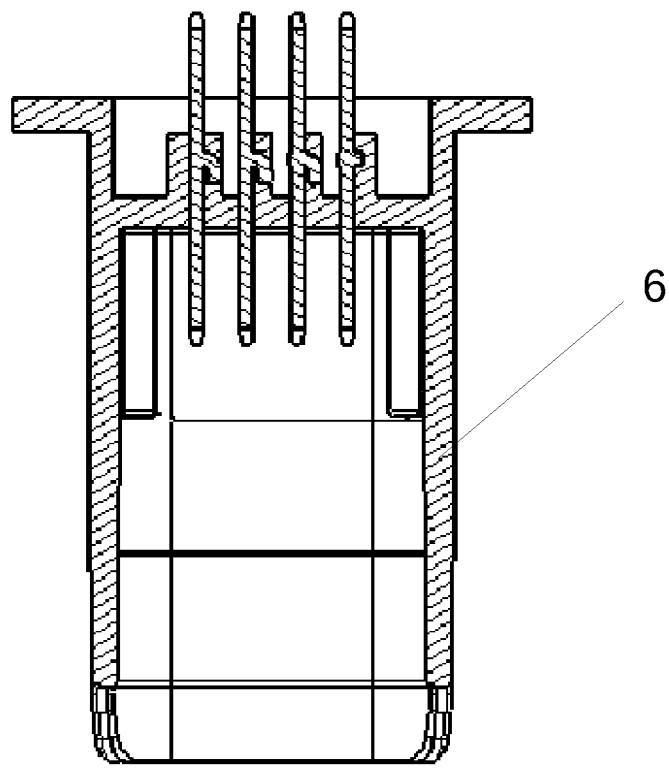
FIG. 10 is a sectional view of the connector portion of FIG. 9.

The camera connector 6 (see FIGS. 9 and 10) is attached through a hole in the lid (see FIG. 8), mating a SMD connector 17 (or header) on the connector PCB 9 (see FIGS. 3 and 6). The outer contour is freely placeable and by that is tension free, when connecting. After connecting, the connector 6 is water and air tightly glued to the rear or back or exterior surface of the lid element 4. Optionally, the lens barrel may be attached past the electronics, housing and connector assembly. By that, all possible mechanical misalignments can be coped with during the imager-lens positioning and alignment calibration. The lens barrel may be screwed, glued or welded onto the camera's body housing 5. A typical method is to cure a UV active glue during aligning the lens to the imager (such as by utilizing aspects of the cameras and methods described in U.S. Pat. Nos. 8,542,451 and/or 9,277,104, which are hereby incorporated herein by reference in their entireties. The glue then compensates for the tolerances.

The camera body piece 5 and/or the lid element 4 may comprise a bendable metal. Optionally, the camera body 5 may be a deep drawn part. Optionally, the camera body 5 may comprise a part made via a stamping or progressive punching (such as a method at which a sheet is formed and cut out in consecutive steps by transporting the part from one stamping station to another). Optionally, the camera lid element 4 may comprise a stamping or progressive punching part. Optionally, the camera lid element 4 may comprise a part made via embossing (also called minting, such as a method using two opposing stamp contours which form a sheet of metal, typically with relatively moderate stretching of the metal compared to deep drawing and typically without cutting).

FIG. 11 shows another example of a camera with a deep drawn camera body portion housing 5 of the body portion 2. The (outbounding) connector portion 60 may be applied by outsert molding to the Lid 4. In the example of FIG. 11, the PCB interconnection is made by using a flexible foil 61 embedded into the PCBs 8 and 9 (instead of having the interconnectors 14 and 15 in FIG. 3). This allows for lateral positioning of the PCB 9 (connector PCB) towards the connector 60, such as when the lid 4 is applied to the housing 5. The imager PCB 8 is arranged against the prior attached lens body 1 and then glued to the camera body portion housing 5. The connector PCB 9 may be held by the connector and an optional screw, which may be screwed to the connector portion 60. The Lid 4 is attached finally by curling, gluing, UV-curing or welding (such as, for example, laser welding or the like).

The assembly of FIG. 12 is another camera (commonly referred to as a pig tail camera) with a pigtail 50. The cable is directly attached to the rear PCB and tightened by overmolding (overmold portion 51). Compared to the prior examples of FIGS. 3 and 11, the deep drawn, punched, embossed or stamped body portion housing 52 has its lens holder lid 53 at the upper or forward end (lens body 1 or imager 10 side). The lens barrel may optionally be held by an outsert molding part 54 on the lid 53 or may be optionally realized by forming the metal lid 53 in a way to intake the lens barrel properly, such as having higher flanges, such as flanges done by punching, embossing or stamping. The lens holder lid 53 may be attached by curling, gluing or welding (such as, for example, laser welding or the like). Optionally, there may be tightening means such as having an O-Ring or a sealing paste or the like.

The camera may utilize aspects of cameras of the types described in U.S. Pat. Nos. 9,233,641 and/or 8,866,907, and/or U.S. Publication Nos. US-2017-0133811; US-2016-0037028; US-2016-0268716; US-2015-0222795; US-2015-0266430; US-2015-0365569; US-2015-0321621; US-2014-0373345 and/or US-2013-0242099, and/or U.S. patent application Ser. No. 15/478,274, filed on Apr. 4, 2017, now U.S. Pat. No. 10,142,532, and/or Ser. No. 15/487,459, filed Apr. 14, 2017, now U.S. Pat. No. 10,230,875, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera for a vision system for a vehicle, said camera comprising:
   a housing comprising a front housing portion and a rear housing portion;
   wherein said front housing portion includes a lens barrel having a lens assembly;
   wherein said rear housing portion includes a connector portion configured to connect to a wire harness of a vehicle when said camera is disposed at the vehicle;
   wherein said front and rear housing portions are mated together to establish an inner cavity in said housing;
   an imager circuit board disposed in said inner cavity in said housing, and wherein an imager is disposed at said imager circuit board and optically aligned with said lens assembly;
   wherein, when said front and rear housing portions are mated together, perimeter flanges of said front and rear housing portions are curled and folded relative to each other to seal said front housing portion relative to said rear housing portion; and
   wherein, when said camera is disposed at a vehicle, said camera captures image data for use in a vision system of the vehicle.

2. The camera of claim 1, wherein said front and rear housing portions comprise a metallic material.

3. The camera of claim 2, wherein said rear housing portion comprises a planar lid portion, and wherein said perimeter flange of said rear housing portion circumscribes said lid portion.

4. The camera of claim 3, wherein said perimeter flange of said rear housing portion is curled with said perimeter flange of said front housing portion about the periphery of said lid portion and an interface of said rear housing portion with said front housing portion.

5. The camera of claim 3, wherein, with said perimeter flanges of said front and rear housing portions curled and folded relative to each other, said perimeter flange of said front housing portion has a J-shaped cross section form and said perimeter flange of said rear housing portion is curled over and into said J-shaped cross section form of said perimeter flange of said front housing portion.

6. The camera of claim 4, wherein said perimeter flanges, when curled, establish a labyrinth seal about the periphery of the interface of said rear housing portion with said front housing portion.

7. The camera of claim 1, wherein said imager circuit board is held in said inner cavity by a spring element.

8. The camera of claim 7, comprising a connector circuit board disposed in said inner cavity of said housing and held therein by said spring element.

9. The camera of claim 7, wherein said front and rear housing portions comprise a metallic material and wherein said spring element comprises a metallic material.

10. The camera of claim 7, wherein said spring element urges said imager circuit board in a direction parallel to a longitudinal axis of said lens assembly.

11. The camera of claim 10, wherein said front housing portion comprises lobes against which said imager circuit board is urged by said spring element.

12. A method of assembling a camera for a vehicle, said method comprising:
   providing a camera housing having a front housing portion and a rear housing portion;
   wherein the front housing portion comprises a lens barrel, a lens assembly and a first perimeter flange circumscribing an opening at a rear portion of the front housing portion;
   wherein the rear housing portion comprises a second perimeter flange circumscribing a lid portion of said rear housing portion;
   disposing at least one circuit element in the front housing portion, wherein the at least one circuit element comprises an imager;
   aligning the imager with the lens assembly;
   mating the rear housing portion with the front housing portion to encase the at least one circuit element in the camera housing;
   wherein, when the rear housing portion is mated with the front housing portion, a connector portion is electrically connected to circuitry of the at least one circuit element, and wherein the connector portion protrudes from the lid portion of the rear housing portion and is configured for electrical connection to a wire harness of a vehicle;
   wherein, when the rear housing portion is mated with the front housing portion, the first and second perimeter flanges are parallel to one another and parallel to a longitudinal axis of the camera housing and lens assembly;
   folding the second perimeter flange over an end of the first perimeter flange such that the end of the first perimeter flange is received in a J-shaped portion of the second perimeter flange; and
   folding the first and second perimeter flanges together such that the end of the second perimeter flange is received in a J-shaped portion of the first perimeter flange.

13. The method of claim 12, wherein said front and rear housing portions comprise a metallic material.

14. The method of claim 12, wherein the at least one circuit element comprises an imager circuit board having the imager disposed thereat and a connector circuit board having circuitry that electrically connects to the connector portion, and wherein said method comprises providing a spring element that supports and retains the imager circuit board at a forward region of the front housing portion and that supports and retains the connector circuit board a predetermined distance from the imager circuit board.

15. The method of claim 12, wherein the first and second perimeter flanges, when folded together, establish a labyrinth seal about the periphery of an interface of the rear housing portion with the front housing portion.

* * * * *